E. E. BARBER.
VISUAL MINIMUM THICKNESS INDICATING MACHINE.
APPLICATION FILED JUNE 22, 1911.
1,125,443.
Patented Jan. 19, 1915.
7 SHEETS—SHEET 1.
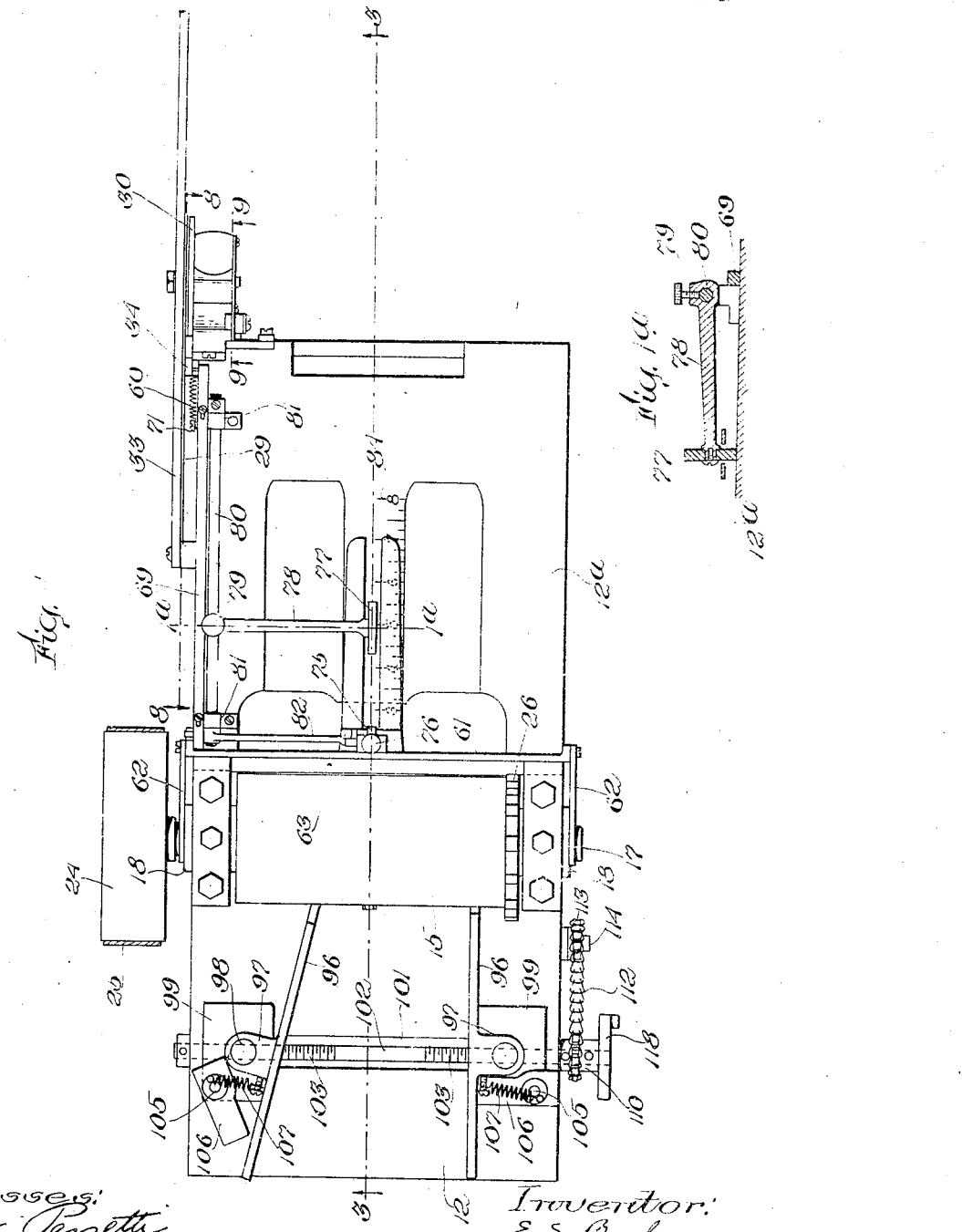

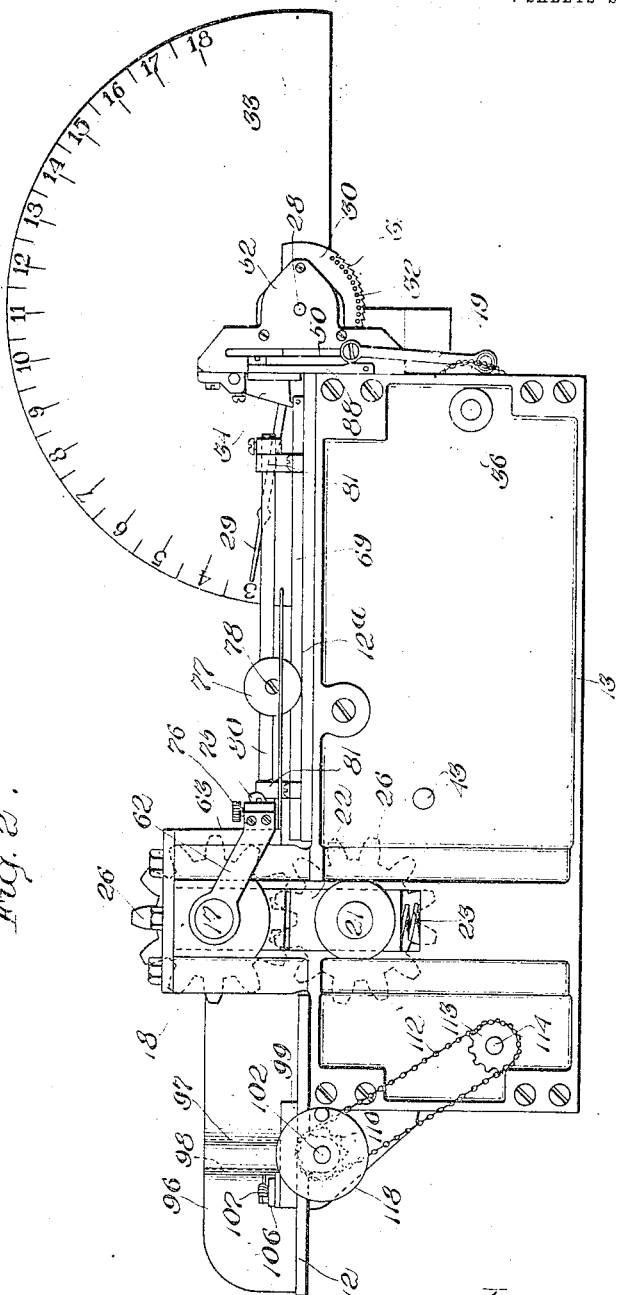

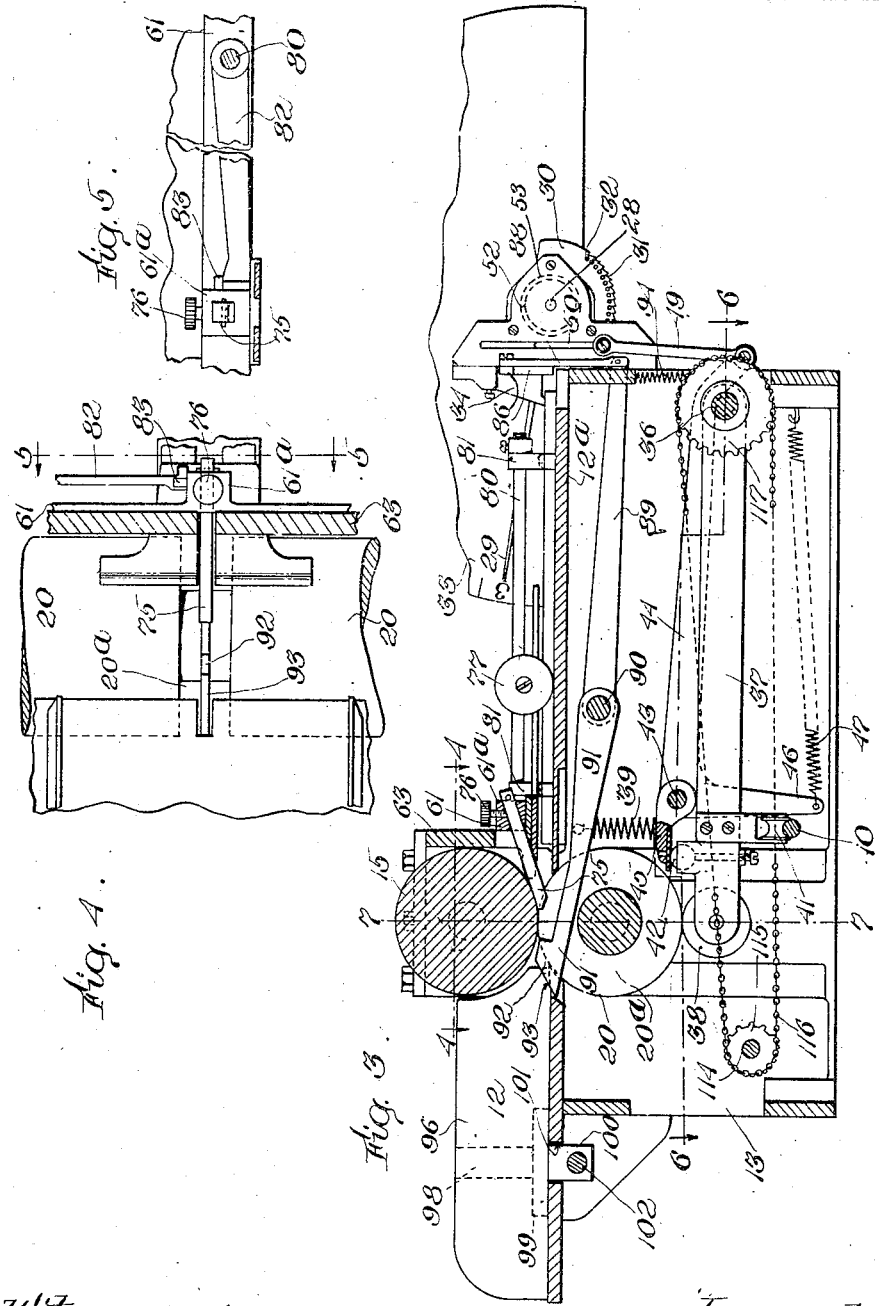

E. E. BARBER.
VISUAL MINIMUM THICKNESS INDICATING MACHINE.
APPLICATION FILED JUNE 22, 1914.

1,125,443.

Patented Jan. 19, 1915.

7 SHEETS—SHEET 4.

E. E. BARBER.
VISUAL MINIMUM THICKNESS INDICATING MACHINE.
APPLICATION FILED JUNE 22, 1914.

1,125,443.

Patented Jan. 19, 1915.
7 SHEETS—SHEET 5.

Witnesses:
P. W. Pezzetti
D. L. Schmidt

Inventor:
E. E. Barber
by Knight Brown Quinby May
Attys.

E. E. BARBER.
VISUAL MINIMUM THICKNESS INDICATING MACHINE.
APPLICATION FILED JUNE 22, 1914.
1,125,443.
Patented Jan. 19, 1915.
7 SHEETS—SHEET 6.
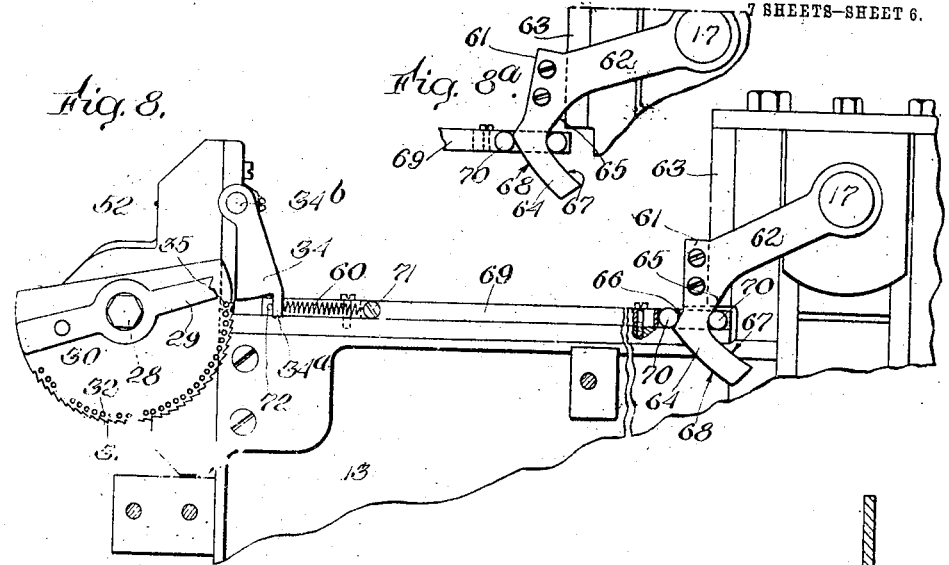
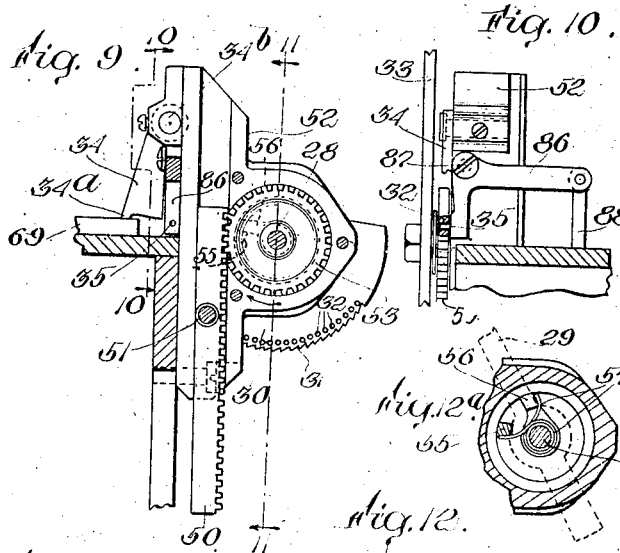
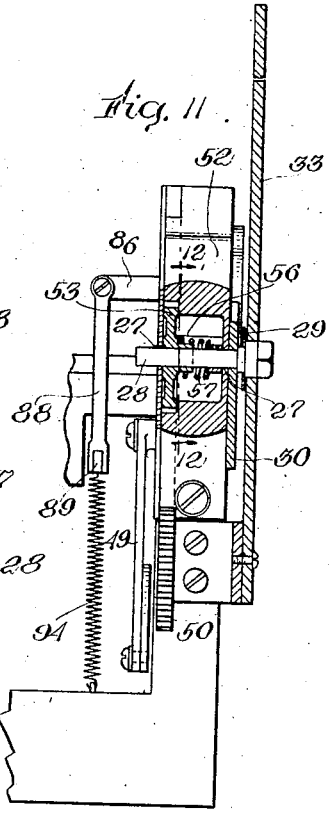

E. E. BARBER.
VISUAL MINIMUM THICKNESS INDICATING MACHINE.
APPLICATION FILED JUNE 22, 1914.

1,125,443.

Patented Jan. 19, 1915.
7 SHEETS—SHEET 7.

Witnesses:
P. H. Pezzetti
D. L. Schmidt

Inventor:
E. E. Barber
by Hight & Brown Quinby May
Attys.

UNITED STATES PATENT OFFICE.

EARL E. BARBER, OF BOSTON, MASSACHUSETTS, ASSIGNOR TO LESLIE L. HARTWELL, OF CHELSEA, MASSACHUSETTS.

VISUAL MINIMUM-THICKNESS-INDICATING MACHINE.

1,125,443.

Specification of Letters Patent.

Patented Jan. 19, 1915.

Application filed June 22, 1914. Serial No. 846,479.

*To all whom it may concern:*

Be it known that I, EARL E. BARBER, a citizen of the United States, and resident of Boston, in the county of Suffolk and State of Massachusetts, have invented certain new and useful Improvements in Visual Minimum - Thickness - Indicating Machines, of which the following is a specification.

This invention has for its chief object to provide a machine adapted to find the exact thickness of the thinnest portion of a cut sole or other like article and to register such thickness for such length of time as may be required to enable the operator to note the same and store the sole with others having the same minimum thickness, before presenting another sole to the machine.

The invention also has for its object to provide a grading machine having means for accurately guiding soles of different widths and forms during their passage through the machine.

To these and other related ends the invention consists in the improvements which I will now proceed to describe and claim.

Figure 3A:
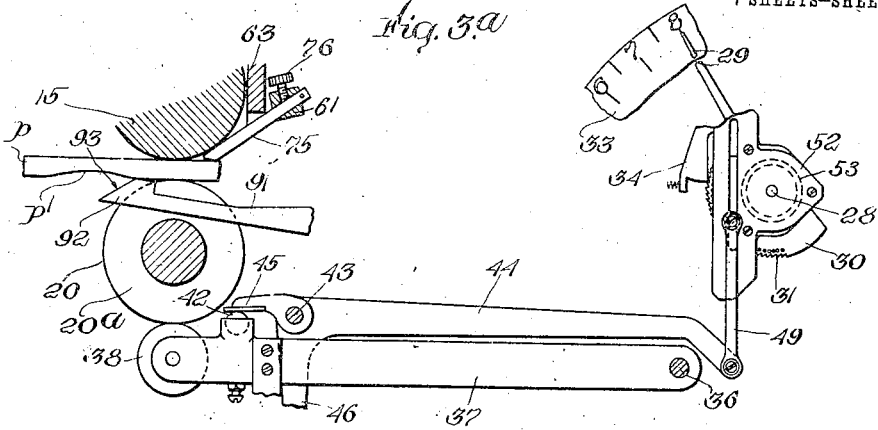
Figure 3B:
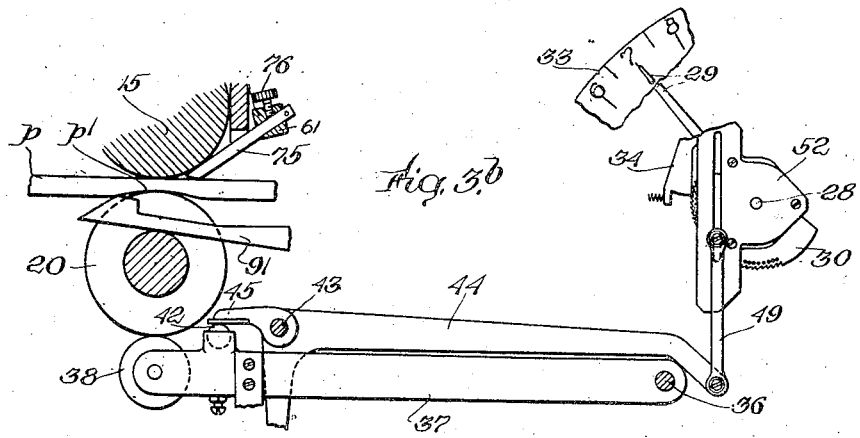
Figure 3C:
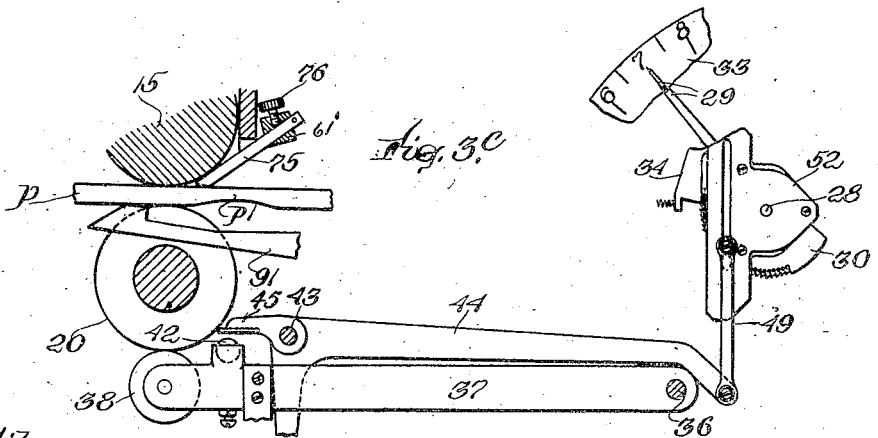
Figure 6:
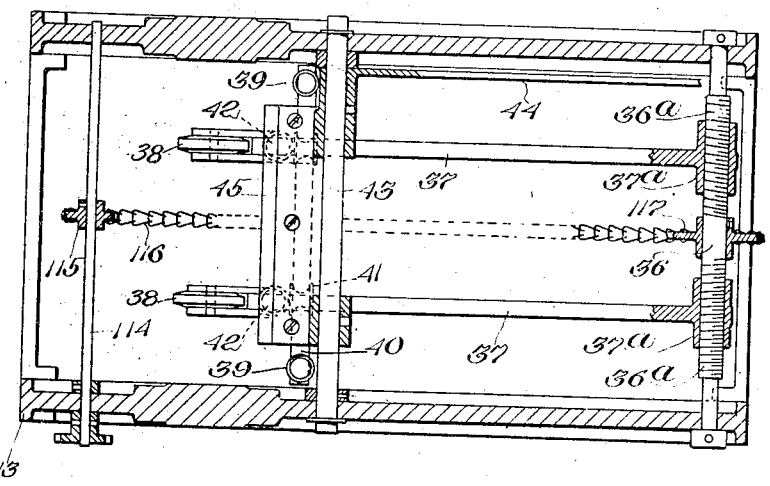
Figure 7:
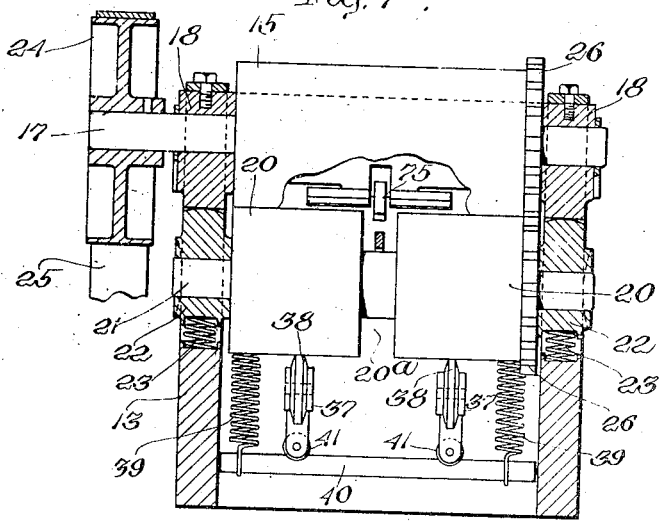
Figure 13:
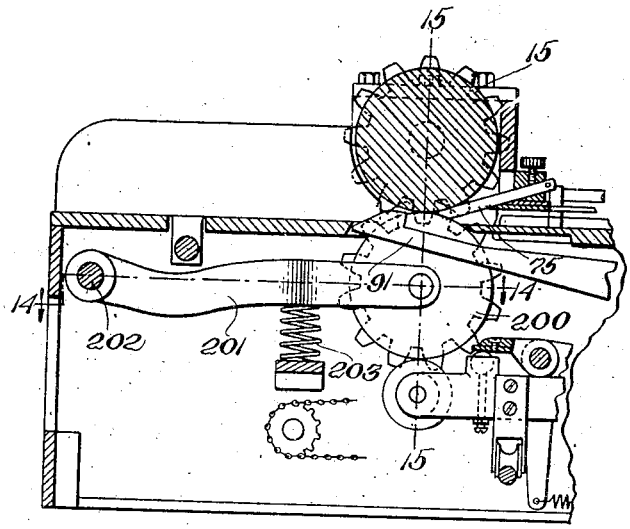
Figure 14:
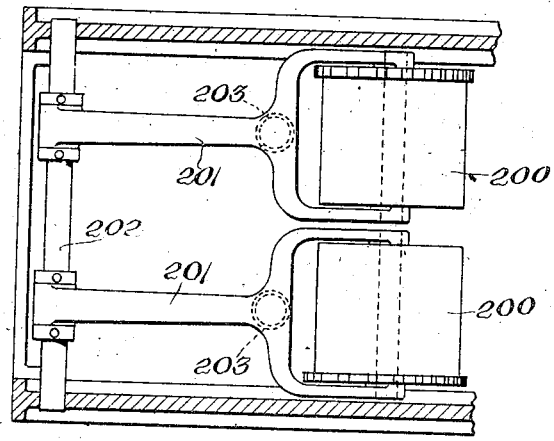
Figure 15:
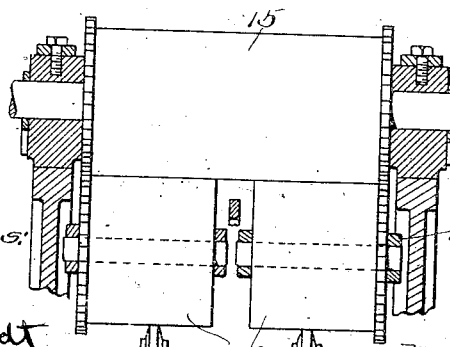

Of the accompanying drawings forming a part of this specification: Figure 1 represents a top plan view of a grading machine embodying my invention. Fig. 1ª represents a section on line 1ª—1ª of Fig. 1. Fig. 2 represents a side elevation of the machine. Fig. 3 represents a longitudinal section on line 3—3 of Fig. 1. Figs. 3ª, 3ᵇ and 3ᶜ represent views similar to Fig. 3, illustrating the operation of the machine. Fig. 4 represents a section on line 4—4 of Fig. 3, showing parts of the machine below said line, other parts being removed. Fig. 5 represents a section on line 5—5 of Fig. 4. Fig. 6 represents a section on line 6—6 of Fig. 3. Fig. 7 represents a section on line 7—7 of Fig. 3. Fig. 8 represents a fragmentary elevation of the machine from the side opposite that shown by Fig. 2. Fig. 8ª represents a view similar to parts of Fig. 8, showing certain parts in changed positions. Fig. 9 represents a section on line 9—9 of Fig. 1. Fig. 10 represents a section on line 10—10 of Fig. 9. Fig. 11 represents a section on line 11—11 of Fig. 9. Fig. 12 represents a section on line 12—12 of Fig. 11. Fig. 12ª represents a view similar to Fig. 12, showing changed position of the pointer. Fig. 12ᵇ represents an elevation of the short shaft hereinafter described, and the arm attached thereto. Fig. 12ᶜ represents an elevation of the gear hereinafter described, and the arm attached thereto. Fig. 13 represents a view similar to a portion of Fig. 3, showing a modification. Fig. 14 represents a section on line 14—14 of Fig. 13. Fig. 15 represents a section on line 15—15 of Fig. 13.

The same reference characters indicate the same or similar parts in all the views.

I will first describe the construction shown by Figs. 1 to 12 inclusive, in which 12 represents a fixed horizontal table attached to the supporting frame 13. 15 represents an upper roll the shaft 17 of which is journaled in fixed bearings 18 at the inner end of the table, the lowest portion of the roll being higher than the top of the table. 20 represents a lower roll, the shaft 21 of which is journaled in vertically movable bearings 22, which are pressed upwardly by springs 23, so that the periphery of the lower roll is normally pressed against the periphery of the upper roll, the nip of the rolls being higher than the top of the table. The upper roll is driven by suitable means such as a belt 25 running on a pulley 24 fixed to the shaft 17. The rolls are provided with intermeshing spur gears 26, the teeth of which are elongated to maintain their operative engagement when the lower roll is depressed by the thickness of a sole passing between the rolls.

Journaled in bearings 27 (Fig. 11) at the rear end of the machine frame is a short shaft 28 to which is attached a pointer 29 and a plate 30 having a segmental series of ratchet teeth 31 and a segmental series of orifices 32. The said pointer and plate form parts of a registering mechanism to indicate the thickness of the thinnest part of a sole or piece passing between the rolls 15 and 20, said mechanism including a fixed graduated dial 33 beside which the pointer 29 oscillates. The movable parts of said mechanism are actuated by the vertical movements of the lower roll. The piece to be graded may be a full length sole or a shorter piece such as a tap. For convenience I will hereinafter refer to the article to be graded as the piece and the same may be something other than either a sole or a tap. The ratchet teeth 31 which form parts of a pointer-restraining means coöperate with a pawl 34 (Fig. 8) in locking the pointer against movement in one direction, or against forward movement over the dial when it registers the thinnest part of the piece, and the orifices 32 coöperate with a pin 35 (Fig. 10) in holding the pointer locked against movement in either direction after the piece has passed through the machine and until another piece approaches the nip of the rolls, so that time is afforded for noting the grade of each piece before the next piece is graded. The pawl 34 is pivoted at 34^b to a fixed part of the frame. Means are also provided whereby the approaching piece, before it is graded, unlocks the pointer and permits it to return to its initial position.

Mounted to oscillate on a transverse rod or shaft 36 (Figs. 2 and 6) are two levers 37 having trundle rolls 38 on their swinging ends, which are pressed upwardly by springs 39 (Fig. 7) against the lower roll 20. Said springs are attached at their upper ends to fixed supports on the frame and at their lower ends to a cross-bar 40 bearing on downwardly projecting abutments 41 carried by the levers 37. Said cross-bar and abutments transmit the upward pull of the springs 39 to the levers 37, the abutments 41 being preferably antifriction rolls for a purpose hereinafter stated. The levers 37 are provided with upwardly projecting abutments 42, which are preferably antifriction balls for the purpose to be described in connection with the abutments 41.

43 represents a rock-shaft journaled in bearings in the frame. To said shaft are rigidly attached a forwardly extending lever arm 45 (Figs. 3 and 6), which has a relatively short forward extension and is elongated crosswise of the machine to bear simultaneously on the two abutments 42 and form a track therefor for a purpose to be stated. To said rock-shaft is also attached a longer rearwardly extending lever arm 44 and a downwardly extending arm 46. A spring 47 attached at one end to the frame and at its other end to the arm 46 acts to press the lever arm 45 downwardly on the abutments 42, and to raise the outer end of the longer arm 44 when said abutments are depressed with the levers 37 by the depression of the lower roll 20.

The longer arm 44 is connected by a rod 49 with a rack 50 (Figs. 9 and 10), the stud 51 which engages the rod with the rack being shown by Fig. 9. Said rack, which is movable in a vertical guide in a fixed casing 52, meshes with a gear 53 (Figs. 9 and 11) on the pointer carrying shaft 28. The rack is slightly reciprocated vertically by variations in the thickness of a piece passing between the rolls 15 and 20, in consequence of the slight vertical movements of the lower roll due to said variations, these movements being transmitted to the rack through the described intermediate mechanism. When the roll encounters a relatively thin portion of the piece, it rises and the rack 50 is correspondingly lowered, and when the roll encounters a thicker portion, it is depressed, and the rack is correspondingly raised.

The gear 53 is not fixed to the pointer carrying shaft 28 and is provided with an arm 55 (Figs. 9 and 12) which projects into the path of an arm 56 attached to said shaft. Said shaft arm 56 is normally pressed against the gear arm 55 by a spring 57 (Figs. 11 and 12) having a coiled portion encircling the shaft 28, and end portions, one bearing on the under side of the arm 55 and the other on the upper side of the arm 56.

When there is no piece between the rolls 15 and 20 the lower roll bears against the upper roll and the arm 55 and arm 56 are in the relative positions shown by Fig. 12, the pointer being in its lowest or initial position shown by Fig. 2. When a piece is inserted between the rolls, the resulting depression of the lower roll by the forward end of the piece imparts movement through the described intermediate mechanism, including the gear 53 and its arm 55, to the pointer shaft 28, the gear being turned in the direction indicated by the arrow in Figs. 9 and 12, so that its arm 55 acts on the pointer shaft arm 56 and turns the pointer shaft to advance the pointer over the dial a distance determined by the first depression of the lower roll, caused by the entrance of the piece between the rolls. If the thickness of the piece varies appreciably, the lower roll alternately rises, and is depressed during the passage of the piece between the rolls, the lower roll rising when it encounters a thinner portion, and being depressed when it encounters a thicker portion. When the lower roll rises the pointer moves backward toward its initial position and is restrained or locked against forward movement by the pawl 34 and one of the ratchet teeth 31, so that it cannot subsequently move forward to indicate a greater thickness. In other words, the pointer is locked against forward movement in any position which it may occupy when the lower roll encounters a thin portion of the piece, and cannot be subsequently moved forward from said position by a thicker portion of the piece. If, however, the lower roll subsequently encounters a still thinner portion of the same piece, the pointer is moved still farther backward, its final position being determined by the thinnest portion of the piece. The pointer is locked in said final position by the pin 35 (Fig. 10) and one of the orifices 32, so that it remains in a position indicating or finally registering the thinnest portion of the piece after the piece has passed away from the rolls and until another piece presented to the rolls acts through the mechanism hereinafter described to retract the pin 35 and release the pointer, which is then returned by the spring 57 (Fig. 12) to its initial position.

The pawl 34 is normally held retracted from the path of the ratchet teeth 31, as shown by Fig. 8, when there is no piece between the rolls, and is released by a piece moving between the rolls, and when so released is held by a spring 60 in yielding engagement with said teeth so long as the piece is engaged with the rolls. The mechanism which normally holds the pawl 34 retracted, in the embodiment of the invention here shown, includes a transverse bar 61 Figs. 1 and 3 extending across the machine and supported by arms 62, which are mounted to oscillate on the shaft 17 of the upper roll. The bar 61 is normally held by its own weight, as shown by Fig. 3, against a fixed part 63 of the frame immediately behind the upper roll 15. One of the arms 62 is provided with an extension 64 (Fig. 8) having an inner cam face 65, an outer cam face 66, and segmental faces 67, 68, which are concentric with the upper roll shaft 17.

69 represents a slide which is movable on the machine frame and has two studs 70, one bearing on the face 65 and the other on the face 66. The pawl projecting spring 60 is attached at 71 to the slide 69, and holds an ear 34ª on the pawl against a pin 72 on the slide. When the bar 61 is in its normal position, the faces 65 and 66 hold the slide 69 in the position shown by Fig. 8, and when the bar 61 is raised from said position, as shown by Fig. 8ª the face 66 acts on one of the studs 70 to move the slide 69 to the left, as viewed in Fig. 8, so that the pawl 34 is yieldingly projected against the ratchet teeth 31.

The bar 61 is raised for the purpose last described by the advancing end of a piece entering between and controlled by the rolls 15 and 20, said end acting on an inner feeler normally located behind the nip of the rolls in the path of the piece and displaceable thereby to raise the bar 61. I have provided two inner feelers adapted to be employed interchangeably. One of said fingers is a finger 75 secured by a set-screw 76 to an ear 61ª on the bar 61 and projecting into close proximity to the nip of the rolls 15, 20, as shown by Fig. 3, the roll 20 being provided with a groove 20ª which receives a portion of said finger and a portion of the pointer-unlocking arm hereinafter described. The advancing end of a piece entering the nip of the rolls encounters the inner end of the finger 75 and forces said finger endwise and upwardly, thus causing the finger to raise the bar 61 to the position shown by Fig. 8ª. The finger 75 is employed when the entire length of the piece is to be tested, said finger being arranged to be acted on by the forward end of the piece before said end has passed away from the nip of the rolls. The other inner feeler is a trundle roll 77 journaled on an arm 78 (Figs. 1 and 1ª) which is detachably secured by a set-screw 79 to a rock-shaft 80 journaled in fixed bearings 81. The trundle roll 77 rests on the rear table portion 12ª of the frame, in the path of the piece projected over said table portion by the rolls 15 and 20, and may be located at various distances from the nip of said rolls, the arm 78 being adjustably secured to the rock-shaft 80 by the set-screw 79. To one end of said rock-shaft is attached a bar-lifting arm 82 (Figs. 1 and 5), the outer end of which extends under a stud 83 on the bar ear 61ª.

When the trundle roll 77 acts as the feeler the finger 75 is removed. When the advancing end of the piece reaches the trundle roll it passes under and raises the latter, thus causing the arm 78 to turn the rock-shaft 80 and raise the bar 61 through the arm 82 to the position shown by Fig. 8ª. It will now be seen that when the finger 75 is removed and the trundle roll 77 is the acting feeler, a portion of the piece, which I call the ungraded portion, passes from the nip of the rolls 15 and 20 before the pawl 34 is allowed to lock the pointer and cause the latter to grade the remaining portion of the piece. The length of the ungraded portion depends on the distance at which the trundle roll 77 is set from the nip of the rolls 15 and 20. The rear table portion 12ª is provided with a graduated scale 84 (Fig. 1) to enable the operator to adjust the trundle roll at the desired distance from the nip of the rolls 15 and 20. When the finger 75 is used as the feeler the trundle roll 77 is displaced by loosening the set screw 79 and swinging the arm 78 upwardly.

The pin 35 (Fig. 10) which engages one of the orifices 32 to lock the pointer after a piece has been graded and removed, is carried by one arm of a bell crank lever 86 pivoted to a fixed support at 87. The other arm of said lever is connected by a rod or link 88 with an arm 89 (Fig. 3) attached to a rock-shaft 90 which is journaled in fixed bearings in the frame. To said rock-shaft is attached a forwardly projecting arm or outer feeler 91 having at its outer end a projection 92 and an inclined face 93. The arm 91 extends through the groove 20ª in the lower roll 20 and its projection 92 and face 93 are held yieldingly by a spring 94 forward from the nip of the rolls in the path of a piece approaching the nip of the rolls, said spring being attached at one end to the frame and at the other end to the arm 89, as shown by Fig. 11. The spring 94 also acts through the rod 88 and bell crank lever 86 to yieldingly force the pin 35 into one of the orifices 32. The advancing end of a piece approaching the nip of the rolls 15 and 20 encounters the inclined face 93 of the arm 91, depresses said arm, and raises the arm 89 which acts through the rod 88 and bell crank lever 86 to retract the pin 35 from the orifice 32 with which it was engaged, the pin being held retracted before and during the entire period of movement or control of the piece by the rolls and until the rear end of the piece passes away from the projection 92 at the end of said period of control, whereupon spring 94 acts to raise the arm 91 and project the pin 35 into an orifice 32, thus again locking the pointer, which is now in a position determined by the thinnest portion of the piece, and remains locked until the arm 91 is again depressed by the next piece presented to the machine so that the final registration is indefinitely prolonged. I will now briefly describe the operation by reference to Figs. 3ª, 3ᵇ and 3ᶜ, which show a piece p passing between the upper and lower rolls and being graded by the machine.

Fig. 3ª shows the leading end of the piece after it has advanced sufficiently to displace the finger 75 and the bar 61, the latter being moved to the position shown by Fig. 8ª, and the pawl 34 being projected to its locking position, a relatively thick portion of the piece being between the rolls so that the pointer is advanced to a correspondingly high portion of the dial. When a thinner portion p' reaches the nip of the rolls the lower roll rises and the pointer drops back correspondingly, as shown by Fig. 3ᵇ, and is locked by the pawl against subsequent movement to a higher point. When another relatively thick portion of the piece p passes into the nip of the rolls the lower roll is depressed thereby and depresses only the levers 37, the abutments 42 on the levers 37 dropping slightly away from the lever arm 45 as shown by Fig. 3ᶜ so that there is no movement of the lever arms 45 and 44, and therefore no movement of the pointer to a higher point on the dial. If another portion thinner than the portion p' subsequently reaches the nip of the rolls, the pointer drops back still farther, but is not in any case again moved forward or higher by the same piece. It follows therefore that after the piece has passed from between the rolls the pointer remains in a position indicating the thinnest portion of the piece until another piece is presented, and depresses the arm 91, thus retracting the pin 35 and releasing the pointer, which drops back from approximately the position shown by Fig. 12ª to the initial position shown by Figs. 3 and 12. It should be remembered that when a piece p passes away from the rolls, the lower roll rises to the position shown by Fig. 3 and moves the lever arms 45 and 44 in the direction required to restore the gear arm 55 to the position shown by Fig. 12ª, leaving the pointer arm 56 separated from the gear arm until the pointer is unlocked by the retraction of the pin 35 and the spring 57 forces the pointer arm against the gear arm as shown by Fig. 12.

The thinnest portion herein referred to is the thinnest edge portion. The machine is not adapted to register surface depressions between the edges of the piece and not extending thereto. It is adapted, however, to register a thin place in either edge not extending to the opposite edge of the piece, the lower roll 20 being adapted to tip or be depressed at either end below the opposite end, because the bearings 22 are mounted somewhat loosely in the fixed guides in which they are movable, so that said bearings are free to tip or rock relatively to their guides. The employment of two levers 37 spaced apart as shown by Figs. 6 and 7, and bearing on the lower roll at points relatively close to the ends thereof, enables the pointer to be actuated as described by the depression of either end of the lower roll.

If desired the lower roll may be made in two relatively independent sections 200 as shown by Figs. 13, 14 and 15, the shafts of said sections being journaled in bearings in the outer ends of forked arms 201 which are mounted to swing vertically on a cross rod 202 and are pressed upwardly by springs 203. The inner ends of the roll sections are spaced apart and the space between them is the equivalent of the groove 20ª and receives the feeler finger 75 and the unlocking arm 91.

The piece is directed to the nip of the rolls 15 and 20 by guides 96 (Figs. 1 and 3). Said guides are preferably adjustable toward and from each other as hereinafter described and are also preferably pivoted so that they may stand either parallel with each other or out of parallelism as shown by Fig. 1; where one guide is longitudinally and the other obliquely arranged. As here shown each guide has an ear 97 adapted to turn on a vertical pivot 98 on a slide 99. Each slide 99 is provided with an arm 100 (Fig. 3) projecting through a transverse slot 101 in the table portion 12, and provided with a tapped orifice engaging a threaded portion of an adjusting shaft 102. Said shaft is journaled in bearings in the frame and has two screw threads 103, one being a right and the other a left hand thread. The tapped orifices in the arms 100 are correspondingly threaded so that the rotation of the adjusting shaft 102 simultaneously moves the guides 96 toward or from each other. The pivotal connection of each guide to its support enables either guide to be moved to an oblique position. To each slide is pivoted at 105 a dog 106 which is connected by a spring 107 with a guide ear 97. When either dog 106 is turned to the position shown at the upper portion of Fig. 1, the accompanying guide 96 is held yieldingly in an oblique position by the spring 107. When either dog is turned to the position shown at the lower part of Fig. 1 the accompanying guide is held rigidly in a position parallel with the path in which the piece moves between the rolls.

A sole-shaped piece usually has one edge which is approximately parallel with the median line of the piece, and another edge which is more oblique to said line. The rigidly held guide is parallel with said median line and the yieldingly held piece conforms to the oblique edge and holds the piece closely against the fixed guide.

The transverse rod or shaft 36 on which the levers 37 are mounted has two screw threads 36ª, one of right and the other of left hand pitch as shown by Fig. 6. The levers 37 are provided with hubs 37ª which are internally threaded to engage the threads 36ª so that the rotation of the shaft 36 adjusts the levers 37 simultaneously toward and from each other. The lever adjusting shaft 36 and the guide adjusting shaft 102 are preferably turned in unison to simultaneously adjust the levers 37 and the guides 96. The shaft 102 is provided with a sprocket wheel 110 which is connected by a chain 112 with a wheel 113 on a shaft 114. Said shaft has a sprocket wheel 115 connected by a chain 116 with a sprocket wheel 117 on the shaft 36. The shaft 102 has a handle or hand wheel 118 by which it may be rotated to cause the simultaneous rotation of the shafts 102 and 36.

For convenience I have hereinafter referred to the upper roll 15 as the gage roll and to the lower roll as the yielding pressure roll. It will be understood that the term yielding pressure roll applies also to the modification shown by Figs. 13, 14 and 15, the pressure roll being in two independently movable sections.

The operation may be briefly described as follows. When the machine is at rest the pawl 34, which prevents forward movement of the pointer, is retracted and inoperative and the locking pin 35, which prevents movement of the pointer in either direction, is projected or under projecting pressure and therefore operative to lock the pointer. A piece moved by the operator toward the nip of the rolls 15, 20, acts to move the member or arm 91, which constitutes an instrumentality associated with the pointer locking means, and causes the retraction of the locking pin 35, the pointer being thus released and moved to zero by the spring 57. The entrance of the piece between the rolls depresses the pressure roll 20 and moves the pointer forward. When the advancing piece is engaged with the rolls and encounters either of the instrumentalities associated with the means for preventing forward movement of the pointer, these being the feelers 75 and 77, it raises said feeler and permits the pawl 34 to be projected by the spring 60, so that the pawl coöperates with the ratchet teeth 31 in preventing forward movement of the pointer from any position to which it may be moved backward by an upward movement of the pressure roll permitted by a relatively thin portion of the piece, the final position of the pointer being determined by the thinnest portion of the piece. Before the advancing piece leaves the nip of the rolls it releases the arm 91, whereupon the spring 94 projects the locking pin 35 into one of the orifices 32, so that the pointer is again locked against movement in either direction. The pointer remains locked until another piece is moved by the operator toward the nip of the rolls, so that the registration of the thinnest portion of the preceding piece is prolonged as long as the operator may desire.

The chief end sought by my invention is a prolonged registration of the thinnest part of a piece being graded, the registration being prolonged until terminated by an act of the operator, such as the presentation of an ungraded piece to the nip of the rolls, said piece displacing a member, such as the arm 91, of a mechanism for unlocking the pointer and terminating the registration.

Having described my invention, I claim:

1. A visual minimum thickness indicator comprising, in combination, a gage roll, a yielding pressure roll movable toward and from the gage roll by variations in the thickness of a piece passing between the rolls, registering mechanism including a pointer movable rearwardly by movement of the pressure roll toward the gage roll, said mechanism having pointer-restraining means adapted to prevent forward movement of the pointer, said restraining means being normally inoperative and provided with an inner feeler located behind the nip of the rolls in the path of a piece controlled by the rolls so that said feeler is held by the controlled piece in position to make the restraining means operative and prevent forward movement of the pointer while the piece is controlled, and automatically-operating-pointer-locking means adapted to lock the pointer against movement in either direction at the end of the period of control of the piece, and provided with an outer feeler projecting forward from the nip of the rolls in the path of a piece approaching the rolls, said outer feeler being adapted to be held by said piece before and during the said period of control to make said locking means inoperative.

2. A visual minimum thickness-indicating machine comprising, in combination, a gage roll, a yielding pressure roll movable toward and from the gage roll by variations in thickness of a piece passing between the rolls, and registering mechanism including a pointer movable rearwardly by movement of the pressure roll toward the gage roll to indicate the thinnest portion of said piece, said mechanism having means for preventing forward movement of the pointer from any position to which it may have been moved rearwardly, whereby a final registration of the thinnest portion of the piece is effected, and automatically-acting pointer locking means adapted to lock the pointer against movement in either direction at the end of the indicating operation, whereby said registration is prolonged, said locking means being normally operative and having an instrumentality movable by a piece approaching the rolls to render said locking means inoperative and terminate the prolonged registration, said instrumentality being held by the piece to prevent the locking of the pointer during the period of control of the rolls by the piece.

3. A visual minimum thickness-indicating machine comprising, in combination, a gage roll, a yielding pressure roll movable toward and from the gage roll by variations in thickness of a piece passing between the rolls, and registering mechanism including a pointer movable rearwardly by movement of the pressure roll toward the gage roll to indicate the thinnest portion of said piece, said mechanism having normally inoperative means rendered operative by the entrance of a piece between the rolls for preventing forward movement of the pointer from any position to which it may have been moved rearwardly, whereby a final registration of the thinnest portion of the piece is effected, and automatically acting pointer-locking means rendered inoperative by mechanism operated by the insertion of a piece between the rolls and the control of the piece thereby, said mechanism releasing the pointer locking means and permitting the operation thereof when the piece is removed from the rolls, whereby said final registration is prolonged.

4. A visual minimum thickness-indicating machine comprising, in combination, a gage roll, a yielding pressure roll, registering mechanism actuated by movement of the pressure roll and having means for registering the thinnest portion of a piece during the indicating operation, and means for prolonging such registration, said prolonging means having a member projecting forward from the nip of the rolls and operable by a piece approaching the rolls to terminate the registration.

5. A visual minimum thickness-indicating machine comprising, in combination, a gage roll, a yielding pressure roll, and registering mechanism including an oscillatory pointer, means actuated by movements of the pressure roll for operating the pointer, means for preventing forward movement of the pointer from any position to which it may be moved backwardly during the indicating operation, automatic means for locking the pointer against movement in either direction, and means for unlocking the pointer after the indicating operation, said unlocking means including a member projecting forward from the nip of the rolls and operable by a piece approaching and controlled by the rolls to release the pointer.

6. A visual minimum thickness-indicating machine comprising, in combination, a gage roll, a yielding pressure roll, registering mechanism including an oscillatory pointer having two series of locking members, means actuated by movements by the pressure roll for oscillating the pointer, and means controlled by a piece being indicated for engaging a member of one of said series of locking members to prevent forward movement of the pointer from any position to which it may be moved backwardly during the indicating operation, means being provided for engaging a member of the other series of locking members to lock the pointer against movement in either direction after the indicating operation.

7. A visual minimum thickness-indicating machine comprising, in combination, a gage roll, a yielding pressure roll, registering mechanism including an oscillatory pointer having a series of ratchet teeth and a series of locking orifices, means actuated by movements of the pressure roll for oscillating the pointer, a pawl, yielding means adapted to engage said pawl with either of said ratchet teeth to prevent forward movement of the pointer from any rearward position to which it may have previously been moved by a thinner portion of the piece, means for normally holding said pawl out of engagement with said teeth, means controlled by the piece being indicated for making said pawl operative to lock the pointer against forward movement from any rearward position to which it may have previously been moved by a thinner portion of the piece, a locking pin normally engaged with one of said locking orifices, and means for holding said pin out of engagement while a piece is passing between the rolls.

8. A visual minimum thickness-indicating machine comprising, in combination, a gage roll, a yielding pressure roll, registering mechanism including an oscillatory pointer having a series of ratchet teeth and a series of locking orifices, means actuated by movements of the pressure roll for oscillating the pointer, a pawl adapted to engage either of said ratchet teeth and normally retracted therefrom, pawl-projecting means including a feeler located in the path of a piece being indicated and displaceable thereby to project the pawl into operative engagement with the ratchet teeth, a locking pin normally engaged with one of said locking orifices, and means for holding said pin out of engagement while a piece approaches and is passing between the rolls.

9. A visual minimum thickness-indicating machine comprising, in combination, a gage roll, a yielding pressure roll, registering mechanism including an oscillatory pointer having a series of ratchet teeth and a series of locking orifices, means actuated by movements of the pressure roll for oscillating the pointer, a pawl adapted to engage either of said ratchet teeth and normally retracted therefrom, pawl-projecting means including two interchangeably operative feelers located at different distances from the nip of said rolls, and each adapted to be located in the path of a piece being indicated and displaceable by said piece to project the pawl into operative engagement with the ratchet teeth, a locking pin normally engaged with one of said locking orifices, and means for holding said pin out of engagement while a piece approaches and is passing between the rolls.

10. A visual minimum thickness-indicating machine comprising, in combination, a gage roll, a yielding pressure roll, registering mechanism including an oscillatory pointer shaft, a pointer fixed thereon, said shaft and pointer having two series of locking members, a gear loose on the pointer shaft, said gear and shaft having abutting arms, a spring which normally presses said arms together, a rack engaging said gear, means actuated by movements of the pressure roll for reciprocating said rack and oscillating the pointer, and means controlled by a piece being indicated for engaging a member of one of said series of locking members to lock the pointer against forward movement from any position to which it may be moved backwardly during the indicating operation, means being provided for engaging a member of the other series of locking members to lock the pointer after the indicating operation.

11. A visual minimum thickness-indicating machine comprising, in combination, a gage roll, a yielding pressure roll, registering mechanism including an oscillatory pointer shaft, a pointer fixed thereon, said shaft and pointer having two series of locking members, a gear loose on the pointer shaft, said gear and shaft having abutting arms, a spring which normally presses said arms together, a rack engaging said gear, a pair of levers yieldingly held against the pressure roll and movable therewith, said levers having abutments, and means for imparting movement from said levers to the rack, said means comprising connected lever arms including a longer arm connected with said rack and a shorter arm bearing yieldingly on said abutments and separable therefrom.

12. A visual minimum thickness-indicating machine comprising, in combination, a gage roll, a yielding pressure roll, registering mechanism including an oscillatory pointer shaft, a pointer fixed thereon, said shaft and pointer having two series of locking members, a gear loose on the pointer shaft, said gear and shaft having abutting arms, a spring which normally presses said arms together, a rack engaging said gear, a pair of levers yieldingly held against the pressure roll and movable therewith, said levers having abutments and being laterally adjustable to vary the distance between them, means for simultaneously adjusting the levers in opposite directions, and means for imparting movement from said levers to the rack, said means comprising connected lever arms including a longer arm connected with said rack, and a shorter arm bearing yieldingly on said abutments and separable therefrom, said shorter arm being transversely elongated to form a track on which said abutments are movable.

13. A visual minimum thickness-indicating machine comprising a fixed table, a gage roll and a yielding pressure roll, the nip of said rolls being above the table, laterally adjustable guides on said table to direct a piece to the nip of the rolls, and means for simultaneously adjusting said guides in opposite directions to vary the space between them, the guides being pivotally mounted to permit either guide to be adjusted to an oblique position, and means pivoted upon the table being provided for holding each guide either rigidly and parallel with the path of a piece passing to the rolls or yieldingly in a position oblique to said path.

14. A visual minimum thickness-indicating machine comprising a gage roll, a yielding pressure roll, a pair of laterally adjustable levers yieldingly held against the pressure roll and movable therewith, said levers having upper and lower abutments, a spring-supported rod pressed upwardly against the lower abutments and constituting a track therefor, connected lever arms including a longer arm and a shorter arm bearing yieldingly on the upper abutments and separable therefrom, said shorter arm being transversely elongated to form a track for the upper abutments, a registering pointer connected with said longer arm, and means for simultaneously adjusting said laterally adjustable levers in opposite directions to vary the space between them.

15. A visual minimum thickness-indicating machine comprising a gage roll, a yielding pressure roll, a pair of laterally adjustable levers yieldingly held against the pressure roll and movable therewith, said levers having upper and lower abutments, a spring-supported rod pressed upwardly against the lower abutments and constituting a track therefor, connected lever arms including a longer arm and a shorter arm bearing yieldingly on the upper abutments and separable therefrom, said shorter arm being transversely elongated to form a track for the upper abutments, a registering pointer connected with said longer arm, a table to guide work to the nip of said rolls, laterally adjustable guides above said table, and means common to the said guides and the laterally adjustable levers for simultaneously adjusting the said guides and levers in opposite directions to vary the space between them.

In testimony whereof I have affixed my signature, in presence of two witnesses.

EARL E. BARBER.

Witnesses:
C. F. BROWN,
P. W. PEZZETTI.